(12) United States Patent  
McFarlane et al.

(10) Patent No.: US 8,997,046 B1  
(45) Date of Patent: Mar. 31, 2015

(54) PROGRAM ANALYZER FOR COMPARING PROGRAMS

(75) Inventors: Roger Delano Paul McFarlane, Saint Laurent (CA); Christopher Howard Hamilton, Montreal (CA); Eric Dingle, Montreal (CA); Sigurður Eggert Ásgeirsson, Beaconsfield (CA)

(73) Assignee: Google Inc., Mountain View, CA (US)

( * ) Notice: Subject to any disclaimer, the term of this patent is extended or adjusted under 35 U.S.C. 154(b) by 405 days.

(21) Appl. No.: 13/598,968

(22) Filed: Aug. 30, 2012

(51) Int. Cl.  
*G06F 9/44* (2006.01)

(52) U.S. Cl.  
CPC .................................. *G06F 9/50076* (2013.01)  
USPC .......................................... 717/122; 707/695

(58) Field of Classification Search  
None  
See application file for complete search history.

(56) References Cited

U.S. PATENT DOCUMENTS

| | | | |
|---|---|---|---|
| 6,393,438 B1 * | 5/2002 | Kathrow et al. | 707/690 |
| 6,625,612 B1 * | 9/2003 | Tal et al. | 707/999.102 |
| 6,954,747 B1 * | 10/2005 | Wang et al. | 706/54 |
| 2013/0066901 A1 * | 3/2013 | Marcelais et al. | 707/769 |
| 2013/0086075 A1 * | 4/2013 | Scott et al. | 707/747 |

* cited by examiner

*Primary Examiner* — Jue Louie  
(74) *Attorney, Agent, or Firm* — McDermott Will & Emery LLP

(57) ABSTRACT

In one configuration, a program analyzer for comparing a first and second program is disclosed. The analyzer may be stored on tangible computer readable storage media, and configured to be executed by a processor of a computer. Each program may comprise a plurality of blocks, each block comprising a block identifier. The analyzer may comprise a preparation process, a comparison process, a refinement process, a repetition process, and an output process.

24 Claims, 8 Drawing Sheets

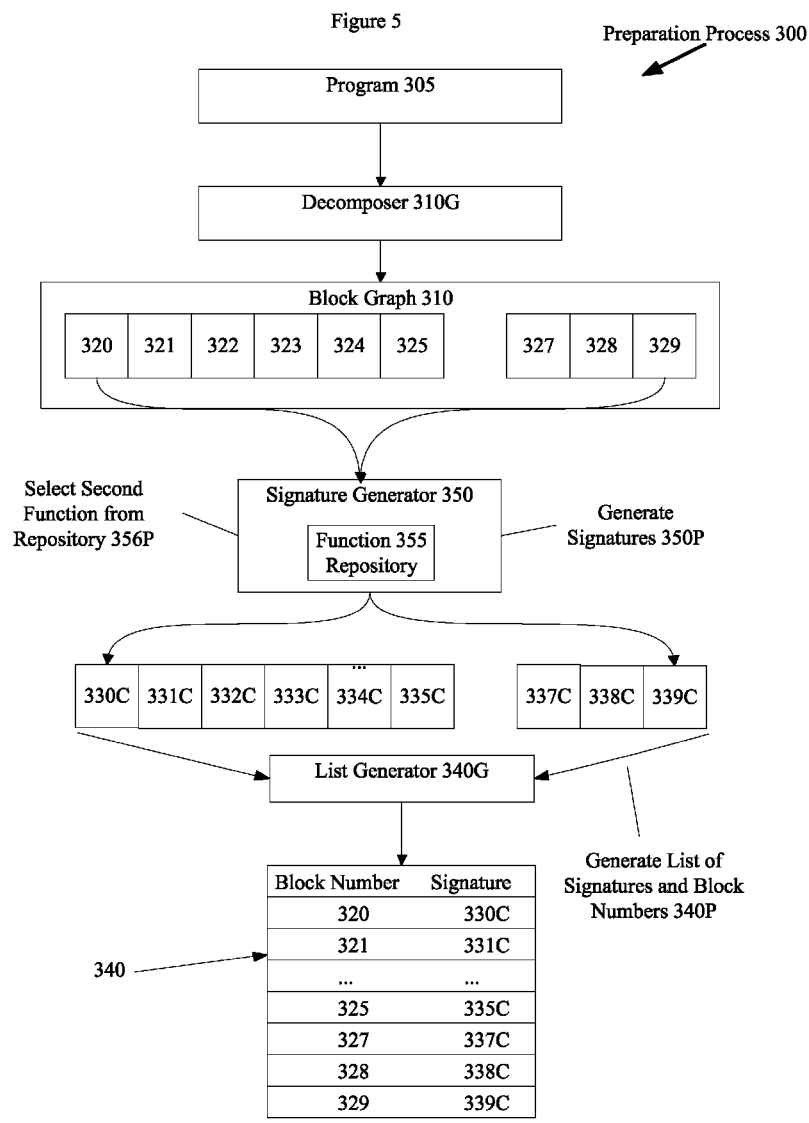

PROGRAM ANALYZER FOR COMPARING PROGRAMS

BACKGROUND

Profile based optimizers generally work by first instrumenting a binary, then profiling it, and finally using the profile information to apply some transformation to the original binary. The results of the optimization may depend on the scope of the profiling. Software projects may evolve continuously, and some may involve daily releases (such as web browsers). The time and effort required to run full profiles on every single release may be prohibitive, because of the frequent release rate of the binaries.

Some modern software projects have very short development cycles with nearly continuous releases. Pushing new binaries to all users may be prohibitively expensive, especially if the changes in the source code are small. Current research efforts to address this problem include solutions such as developing programs that determine the differences between binaries to be sent to users, but such programs may be file format agnostic and use heuristics. As such, these programs may be less efficient than they could be.

SUMMARY

In one configuration, a program analyzer for comparing a first and second program is disclosed. The analyzer may be stored on tangible computer readable storage media, and configured to be executed by a processor of a computer. Each program may comprise a plurality of blocks, each block may comprise a block identifier and a semantic meaning.

The analyzer may comprise a preparation process, a comparison process, a refinement process, a repetition process, and an output process. The preparation process may comprise processes such as: generating a first block graph of the first program; using a signature generator to generate a signature of each block in the first block graph; applying a function to the blocks from the first block graph to generate the signature using the signature generator; storing the signatures from the first block graph in a first list; generating a second block graph of the second program; using the signature generator to generate a signature of each block in the second block graph; applying, with the signature generator, a function to the blocks from the second block graph to generate the signature; storing the signatures from the second block graph in a second list; and generating a first map.

The comparison process may comprise processes such as: identifying signatures that appear only once each in the first and second list; determining the block numbers associated with these signatures; updating the first map to associate these block numbers with each other; and removing these blocks and their signatures from the first and second list.

The refinement process may comprise processes such as: selecting a second function for use by the signature generator; using the second function to generate signatures of the blocks from the first block graphs, wherein fewer duplicate signatures are generated; and generating new signatures for the blocks using the second function.

The repetition process may comprise repeating the comparison process and refinement process until a condition is met. The output process may comprise outputting the first map comprising a correlation between blocks numbers in the first program and block numbers in the second program, wherein the first map represents blocks that are likely to have matching semantic meanings in the first and second program.

BRIEF DESCRIPTION

The details of one or more implementations are set forth in the accompanying drawings and the description below. Other features, aspects, and advantages of the disclosure will become apparent from the description, the drawings, and the claims.

FIG. 5 shows an illustrative configuration of the refinement process.

DETAILED DESCRIPTION

Figure 1:
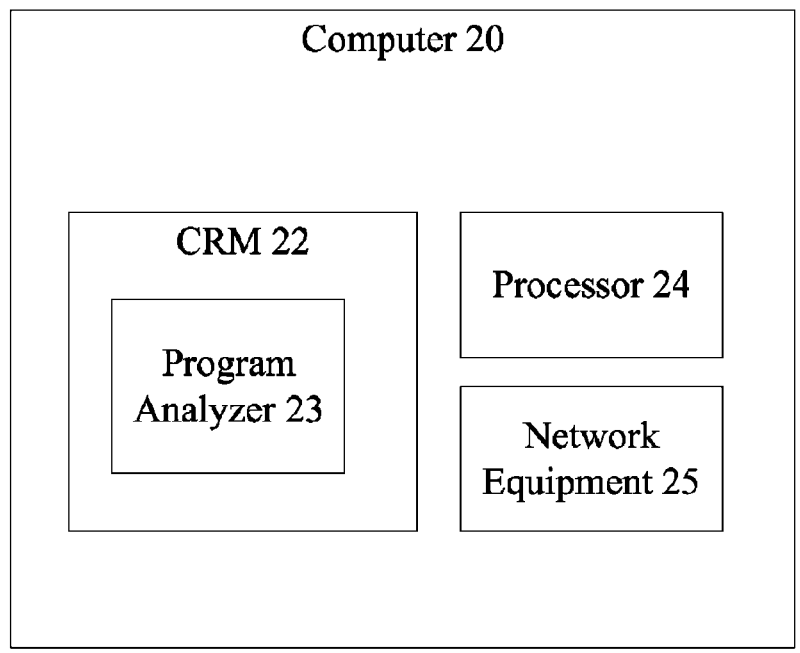
FIG. 1 shows an illustrative configuration of a schematic diagram of a specialized computer.

In some configurations, a program analyzer for analyzing a plurality of block graphs (e.g. an abstract representation of an executable image file or binary or dynamic linked library) is provided. The program analyzer may comprise a plurality of processes including a preparation process, a comparison process, a refinement process, a repeating process, and an output process. The preparation process may include transforming a first and second program into a block graph, generating signatures of the blocks in the block graph, and storing the blocks and signatures on a respective list. The comparison process may include determining whether any of the signatures on each list are unique on their own list, and whether both lists have those same signatures. The comparison process may also include creating a map of signature-block pairs which are on both lists, and a second map which features signature-block pairs that are only on one of the lists. To the extent the process of generating signatures yields signatures that are duplicated on each of these lists, the signatures can be recalculated using a more detailed process or function. These more detailed signatures would then be re-compared. The results of the subsequent comparison (one or more lists or maps) can be output for use with additional programs such as code writers or diff generators.

As part of a comparison process, an identifier may be configured to identify substantially similar blocks between the two block graphs using nothing but properties that are intrinsic to the graph itself (such as number of references, number of referrers, reference-referrer relationships, block size, reference/referrer offsets, etc.) (although extrinsic properties may be used in some configurations.) Extrinsic properties may include additional data that is provided in a side-channel to the program itself. The extrinsic property may exist in the form of symbol and type information as provided by a debug file (produced by a compilation and linking process, which may or may not be for running the program. Extrinsic properties may allow a reconciler to reconcile the block graphs between two distinct but related binaries to be reconciled. A reconciliation process may include the process of making a mapping between blocks in one block graph and blocks in a second block graph. 'Reconciling' two blocks may include identifying the block as being substantially similar to one another. Reconciling of the two distinct binaries may allow a map generator to generate a mapping for a substantial portion of the blocks. A signature generator may be configured to determine signatures for each block (a plurality of blocks compose the block graph). These signatures and blocks may be stored on a list created by a list generator.

A side channel may include any data that is not stored explicitly within the binary, but rather stored in a separate file. Extrinsic data may consist of performance metrics that are extremely expensive to compute. Rather than recomputing them entirely for the new binary B, the program analyzer may assign existing metrics from binary A via the mapping computed for the update of binary A to binary B. This process may allows older extrinsic data to be carried forward to the new binary at less cost than recomputing the metrics entirely. In some cases the cost savings may be substantial.

In some configurations, the process of generating a signature from the blocks (part of the preparation process) and comparing the blocks for unique signatures (part of the comparison process) may be repeated. For example, in a first pass, the signature generated by the signature generator may be the content of each block (e.g. static binary, contents, position type, count of references, referrers, etc.). In the second and further rounds, the signature generator may update the signatures using the block's content signature plus the content signatures of the block's references and referrers. This process can be repeated n times (configurable n). Once the cycle has been executed a plurality of times, the list generator may construct a list of blocks and signatures, each signature representing its place in the block graph, with its context being all neighbors up to distance n from it.

Context may include a neighborhood of blocks (essentially nodes in a graph, where nodes are connected if there is a reference/referrer relationship between them) whose contents influence the value of the signature. If the program analyzer is using a recursive signature function and has applied the function n times, then all blocks that are distance at most n blocks away from the block will be considered by the function. Nodes may be a representation of blocks as points in a graph, with the lines connecting the nodes representing relationship between blocks. A recursive signatures may be applied after a termination condition is met. If using the current set of signatures, the program analyzer is unable to make further mappings, the program analyzer may be configured to stop the comparison and refinement process. The comparison and refinement process may be exited, and a signature generator may update the signatures by expanding the 'context' or neighborhood to be considered in its generation. Once the signatures are updated, the comparison and refinement process may be repeated until the termination condition is met again. This process may be repeated n times, where n is the 'width' of the graph (the maximum distance between any two nodes). For example, assume the function used by the signature generator takes as an input a subgraph of the block-graph. Initially, signature generator may use a single block as an input for this function. Next, the signature generator may use a block and all of its immediate neighbors (thus the neighborhood has been enlarged for the purpose of being considered in the determination of the signature). Next, a block and all the blocks in the block-graph at most a distance two from it (in graph theoretic terms). This process may be repeated enlarging the neighborhood in the process.

A list analyzer may be configured to analyze a list of signatures unique in both the first and second lists (which come from the blocks and signatures of the first and second block graphs). The list analyzer (or a separate mapper) may update a first map to include those blocks that have unique signatures and appear in the first and second list. Each of blocks may have a semantic meaning. Blocks in the first map may have matching or similar semantic meanings as compared to blocks in the second map. Whether the blocks are the same, as opposed to just having a similar or matching semantic meaning, may depend on the signature function being used. If the signature function compares the entire contents of the blocks, then having the same signature would imply a very high probability that the blocks are identical. Whereas if a looser or more fuzzy comparison is performed, the contents of the blocks may not be identical. The list analyzer may also update a second map with signatures that are unique to their respective lists, but don't have a matching signature in the other list.

An example process may include one or more of the following processes. The signature generator generates signatures of the block for n=0. For all blocks that are unique (e.g. there exists only one of them with a given signature in each of the block graphs) as determined by the list analyzer, a mapper updates a mapping between the blocks (having the same signature in the first and second block graphs). The list analyzer may remove the blocks from consideration on future passes. The signature generator next may recalculate the signatures (enlarging the neighborhood) which may involve using a different function or incorporating different variables into the calculation. The act of recalculating signatures may provide more context, thereby allowing the signature generator to create signatures with new pairs (e.g. a signature from each block graph) of unique signatures. The process can be repeated until recalculating the signatures does not create any new unique blocks or some other termination condition is reached.

The above process (or specialized machine configured to run that process) may include using multiple different signature techniques (e.g. one may based on network properties, as described above, another may be based on supplemental type and name information as gleaned from debug information, etc). In addition, mapping a pair of blocks that were unique with regard to one property may now create unique blocks with regard to another property, so the comparison process may need to be configured to account for this possibility. While a process of generating a signature in a recursive fashion was described, not all of the signatures need to be created in a recursive manner.

Some signature generators may be configured to assign signature types to the signatures so that these signatures may be given more preferred mappings (meaning they are mapped first.) Some signatures may be more 'useful' than others. That is, some signatures may have a higher associated confidence in their ability to predict a match. For example, the name of a function may be a fairly accurate signal, but in some cases it is entirely possible for programmers to change function names between versions of a program. For example, in a first block-graph, FunctionA has a first functionality and FunctionB has a second, different functionality. Suppose that in the second block-graph (representing a newer version of the binary), the function contents remained identical but their names were reversed. If a function name is used as a signature (an extrinsic property provided by the debug information), the program analyzer may generate a false mapping between the functions. If, however, the function generator incorporates intrinsic contents (instructions, references, referrers, etc) of the blocks, the likelihood of making a correct mapping (identifying FunctionA from the first block-graph with FunctionB of the second block-graph, etc) may be increased. Basically, adding priorities to the signatures allows the program analyzer to avoid the case where different conflicting mappings are suggested by different signature functions. The program analyzer may be configured to choose the one with the highest priority.

Some configurations of the comparison process may feature progressive matching, that is, starting with a tight signature matching process (e.g. the signature must match exactly), and progressing to using less exact, fuzzy matching processes. In addition, the map of the matching unique signatures themselves may feature a tightness parameter (e.g. some qualitative measurement of the confidence of the mapping). One of the outputs of the process may be a map of blocks existing in both block graphs including a measurement of the confidence with which the comparison process determined each pair of blocks are the same.

A code generator may use the generated list of mappings to produce more stable binaries (meaning binaries change less between revisions) by producing a layout that ensures that blocks with existing mappings move as little as possible between images (compiled versions of the code). The code generator may have reconciling technology, that is, the code generator may be configured to relink the second block image with the blocks in an order substantially similar to the first block image. This will make the images generated between a first and second version of a program similar, and the differences between them more amenable to compression.

Additionally, a diff generator may be provided and use the map to generate diffs of the binaries (diffs (differentials) are listings of the differences between two versions of a binary). An advantage of pairing the map generated by the list generator and the diff generator is that the additional context provided by the map of the list generator may make the diff generator more efficient because the additional context may allow the program analyzer to map the first and second program with fewer false positives and fewer false negatives with respect to block matches.

Figure 2:
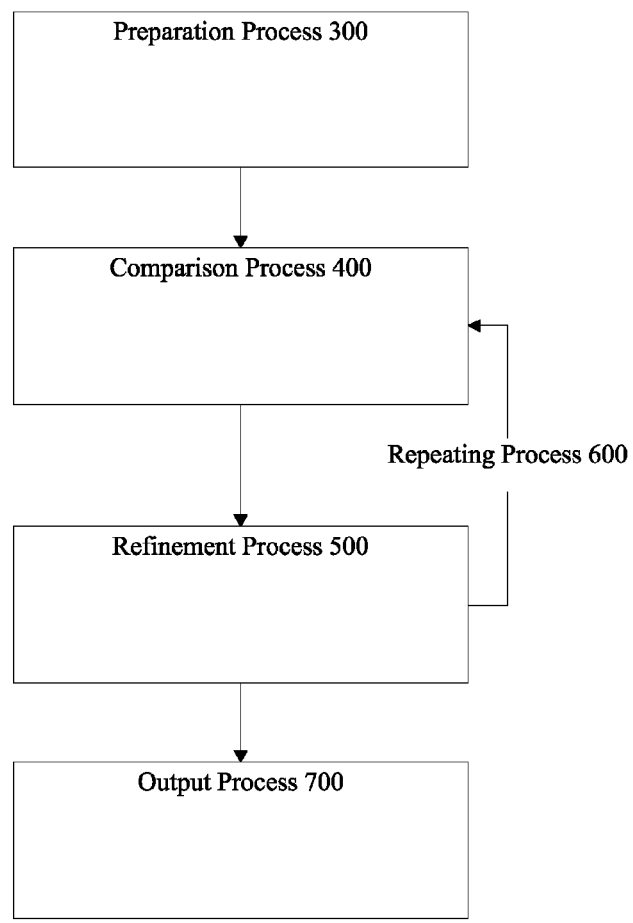
FIG. 2 shows an illustrative configuration of a process flow.

FIG. 1 illustrates a program analyzer 23 that may be stored on tangible computer readable storage media (CRM) 22. The program analyzer provides specific instructions to a specialized computer 20 comprising the CRM 22, a processor 24 and network equipment 25. As shown in FIG. 2, the program analyzer 23 may comprise a plurality of processes including a preparation process 300, a comparison process 400, a refinement process 500, a repeating process 600, and an output process 700, any of which may be optional or rearranged in alternative embodiments.

Figure 3A:
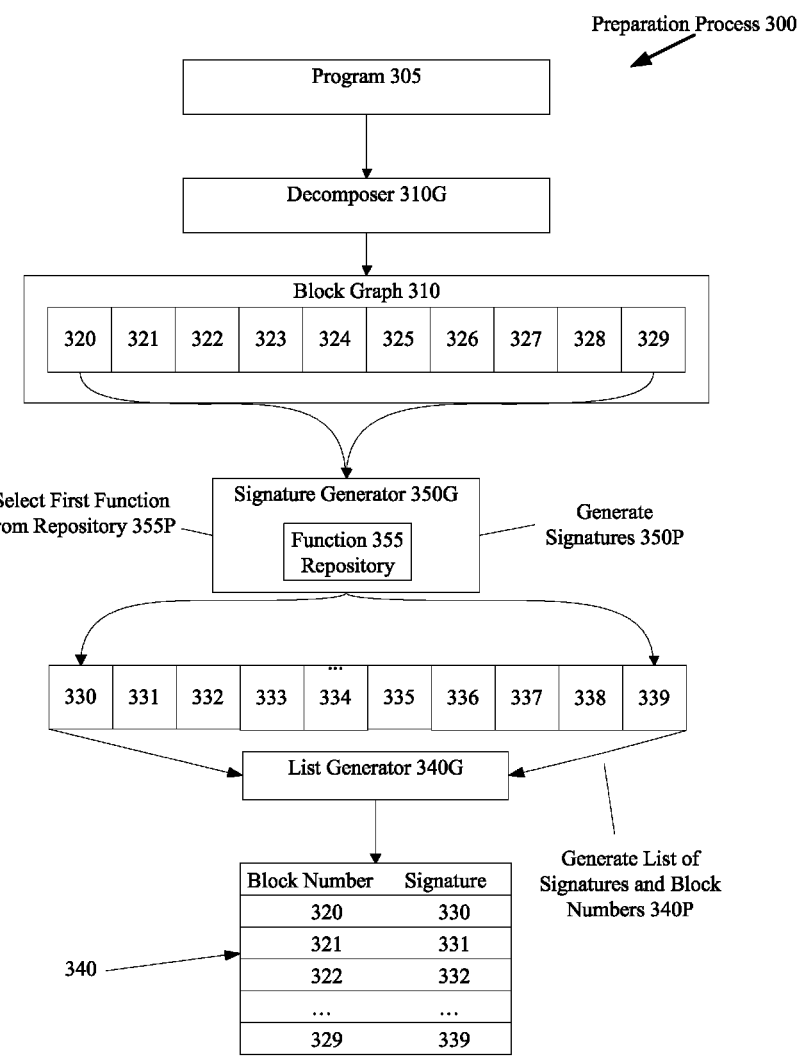
FIGS. 3A and 3B show an illustrative configuration of the preparation process.
Figure 3B:
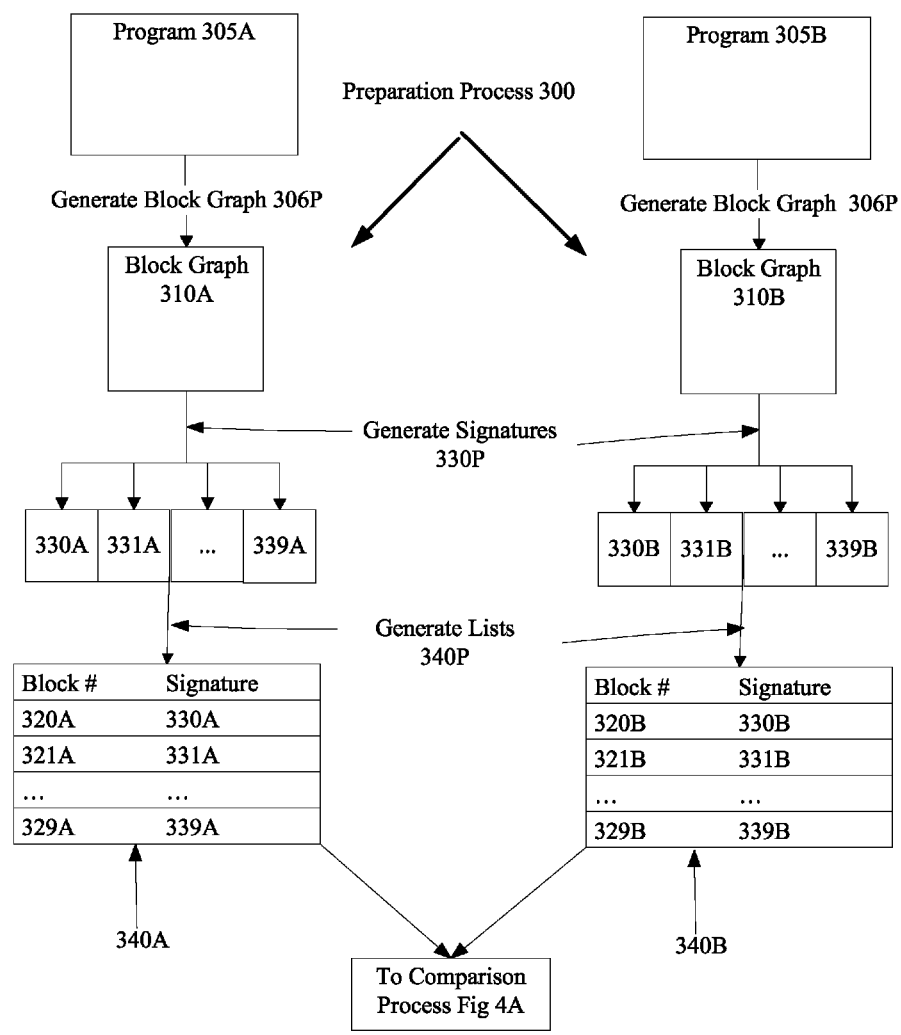

The preparation process is illustrated in additional detail in FIGS. 3A and 3B. In FIG. 3A, program 305 is a program to be processed according to the processes described herein, such as a web browser program or other application program. A decomposer 310G may generate a block graph 310 from program 305. A block graph may be an intermediate representation of a program file. Each block may be a function or a data structure in the image. The connections between them (making it a graph) are the references from one block. For example, if FunctionA calls FunctionB and also access DataC, then there will be a connection between FunctionA and FunctionB, and also between FunctionA and DataC. The block graph 310 may comprise a plurality of numbered blocks. FIG. 3A shows block numbers 320-329. The signature generator 350G may generate 350P a signature for each block using a function from its function repository 335. The signature generator 350G may select a first function 355P from the repository 355. FIG. 3A shows signatures (330-339) being generated. A signature is essentially any compact summary representation of the one aspect of the contents of a block. One example of a signature may be a simple fixed size hash of a few key properties: the size of the block, the contents of the block's data, then number/size/type of its references to other blocks. Another signature may simply be the name of the block as provided by an external debug data file. In general, a signature may be the result of some function which captures the essence of the contents of the block, but of fixed length for rapid comparisons. The program analyzer may be configured such that if two blocks are identical, then their signatures will match. Similarly, the program analyzer may be configured such that if two blocks have identical signatures, there should be a very high (>99% chance) that the blocks are identical. A list generator 340G may generate 340P a list 340 of block numbers and signatures. FIG. 3A shows list 340 comprising block numbers 320-329 and signatures 330-339. This list is illustrative. Actual block graphs may comprise thousands of blocks, and the resulting lists may comprise thousands of paired block numbers and signatures.

As shown in FIG. 3B, a first program 305A and a second program 305B may be processed by the program analyzer to form lists 340A and 340B. The illustrated process comprises: generating 306P block graphs 310A and 310B of each of the first and second program; generating 330P signatures from the block graphs; and generating lists (340A & 340B) from the blocks. The lists may be stored in memory. Signatures of each block in the block graph can be generated 330P to generate 340P lists 340A and 340B. As shown, the analyzer can generate a signature for each block, and each block may comprise a block number. The list may comprise a number of block number-signatures pairs. The block numbers may be assigned and generated in monotonic increasing order as the block-graph is built. The block numbers may serve as a unique identifiers of a block in the context of a block-graph. In some configurations, they may be randomly generated.

In some embodiments, the output of the analyzer will be a list of signatures that are the same in both programs. Since the analyzer may be configured to represent the program as a block graph, each block graph may comprise hundreds or thousands of blocks, and a signature of each block may be generated. The process of determining a list of block numbers in the first program that have the same signatures as a second list of blocks in the second program, may reveal which code blocks are the same and which are different in each program. This information (i.e. a list of signature-block pairs) may be useful for determining what test data based on the first program is still applicable to the second program, because, for example, the blocks of the program that generated the test results were not affected by the revision of the program.

As an example, the analyzer may generate a first block graph comprising two code blocks (e.g. block number 0011 and 0101) each having a signature of 1000, and the second block graph may comprise one code block having a signature of 1000. Since the signature is not unique among the list of code blocks in the first block graph (because two blocks have this same signature), the comparison process cannot determine whether block number 0011 or 0101 exists in the second block graph. To handle this occurrence, the analyzer may be configured to repeat the signature generation process applying a more detailed function to the two code blocks so that the resulting signature is different.

The functions stored in repository 335 may be of differing or increasing complexity. The functions stored in the repository may be configured to create the same signature for two blocks comprising the same data or code, and a different signature for two blocks comprising different data or code. In other words, given the same input, the function may be configured to generate the same output, but given different inputs the function may or may not generate different outputs depending on the level of complexity of the function. A more complex function may be more likely to generate a different output given different inputs, but it may also take more clock cycles to execute. So, in a first round of execution, a simpler function may be selected. If the results of using the simpler function generates a list of functions having the same signature, the signature generator 350G may need to execute the refinement process 500 to select a more complicated function ("crank up the refinement") so that a function of minimum complexity is selected that generates different results given different inputs, but not so detailed that it takes a larger than necessary number of clock cycles to compute signatures. Against these constraints, the analyzer may also be configured to determine how many passes (repetitions of the comparison process) is optimal since each pass of the signature generation and comparison process requires additional clock cycles. A programmer or a user may provide the functions to the signature generator or store them in the function repository. Additionally, increasing the specificity or neighborhood of the signature functions (such as when no more matches are able to be made at the moment) is a process that may have a point of diminishing returns or even an upper boundary as to the number of times specificity may be increased. The signatures, how many times to change them, what priority to apply them etc., may be set manually, or the program analyzer may use information from the signature list to drive the process dynamically or automatically. For example, the program analyzer may be configured to determine which signature is currently the 'least' useful. That is, the signature that is producing the lowest number of unique values (thus yielding the least precise match information). The program analyzer may be configured to 'tighten' up that signature and try the comparison & refinement process again. The program may be configured to be repeated until the amount of matches determined is no longer changing (the signature does not yield more unique signatures after 'tightening' it), or some until some maximum number of attempts has been made.

The repository 335 may comprise two functions, $F_1$ and $F_2$. $F_1$ may be performed on the current block to generate a signature, $f_1(block_1)$, and if the signature is not unique ($f_1(block_1)=f_1(block_2)$), a more detailed function $F_2$ may be selected so that $f_2(block_1) \neq f_2(block_2)$. $F_1$ may be a variety of functions, such as performing a mathematical algorithm on the block (recall that the block is binary code or data . . . a string 0's and 1's.) $F_2$ may be a more detailed mathematical algorithm, one selected that will be less likely to generate the same signature given two inputs. Rather than making the function itself more complicated, as predicting whether a given mathematical operation will be less likely to generate a unique result may be difficult, the signature generator can adjust the input used for the function. In the example just described, $block_1$ was the input. $F_2$ may be configured so that it adds all the blocks which refer to the current block when generating the signature (i.e. the "calling blocks" the blocks that call the current block). That is $F_2(current\ block)=F_1$ (current block+calling blocks). Extending the example, $F_3$—the function used in the third pass of the comparison process—may be configured so that it perform $F_1$ on the current block plus the blocks (calling blocks) that refer to the current block plus the "reference blocks" (i.e. the blocks the current blocks refers to). So, $F_1(current\ block)=F_1(current\ block+calling\ blocks+reference\ blocks)$. So, a first pass of the comparison algorithm may perform $F_1(current\ block)$, the second pass may be $F_2(current\ block)=F_1(current\ block+calling\ blocks)$, and the third pass of the comparison algorithm may be $F_3(current\ block)=F_1(current\ block+calling\ blocks+reference\ blocks)$.

Figure 4A:
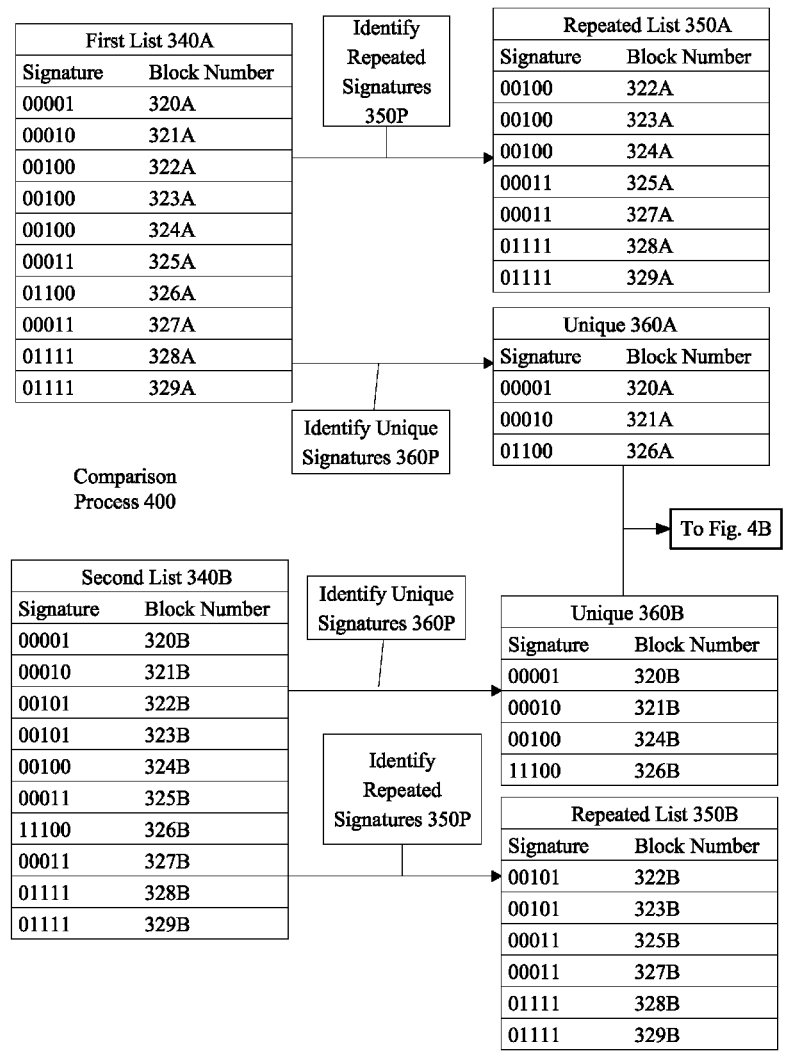
FIGS. 4A and 4B show an illustrative configuration of the comparison process.
Figure 4B:
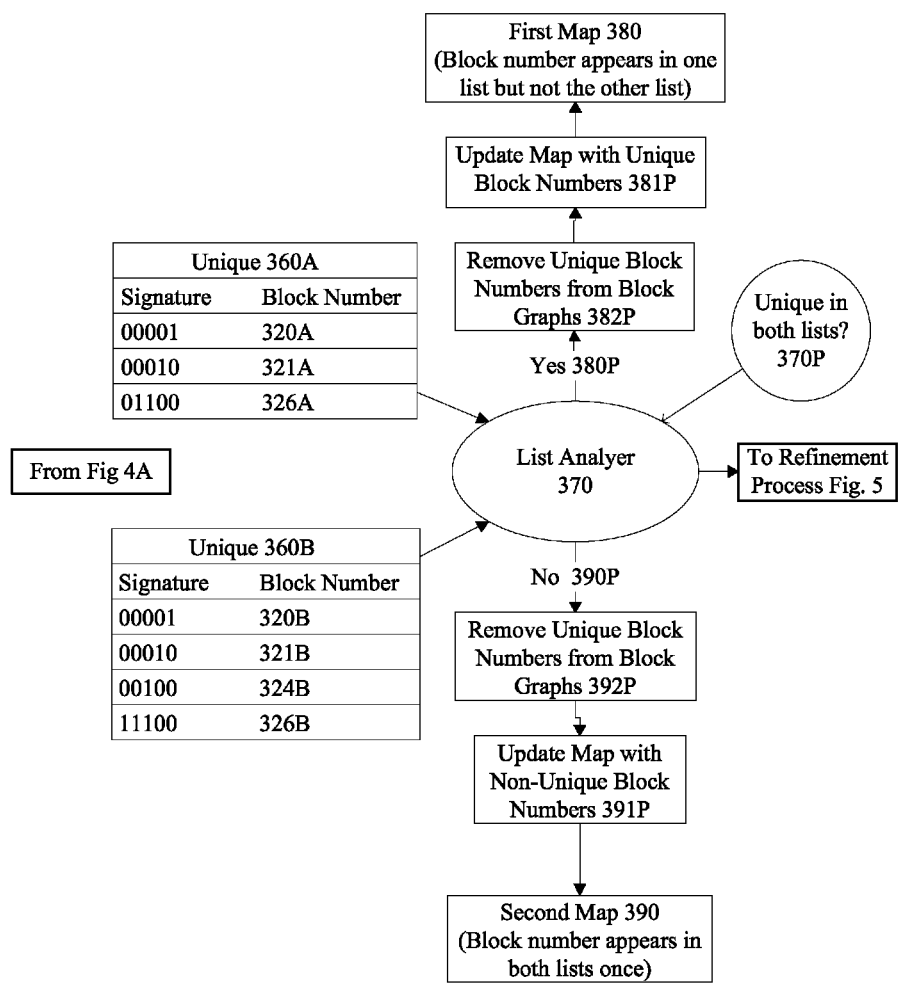

FIGS. 4A and 4B present illustrative views of the comparison process. As shown, the comparison process takes two lists as an input, a first list 340A and a second list 340B. The comparison process may analyze 350P the first list for any signatures that are repeated. The repeated signatures (those signatures appearing more than once in the first list) may be stored in a repeated list 350A. In the example shown, signatures 00100, 00011, and 01111 are signatures that appeared more than once in list 340A. The unique signatures, 00001, 00010, and 01100 appear once in the first list 340A, and the comparison process identifies 360P them as unique signatures in the first list 340A. A similar process may be performed for the second list 340B. In the example shown, signatures 00001, 00010, 00100, and 11100 are identified as unique within the second list, and signatures 00101, 00011, and 0111 are repeated. The comparison process may generate repeated lists 350A and 350B and unique lists 360A and 360B as shown (see FIG. 4B).

Now referring to FIG. 4B, a list analyzer 370 may determine whether a particular signature appears in both unique list 360A and unique list 360B. Signatures appearing in one of the two lists (380P) may be stored in a first map 380 and signatures appearing in both lists may be stored in the second map 390. The list analyzer 370 may be configured to perform a binary determination as to whether a given block number satisfies 380P or fails 390P the signature list uniqueness inquiry 370P. If multiple passes of the comparison process are performed, the list analyzer (or a mapper—not shown) may update (381P and 391P) the maps.

Block numbers stored in the first map 380 represent blocks of code or data which exist in one of the two programs but not both. Block numbers stored in the second map 390 represent blocks of code or data which exist in both programs. Examples of functions may include a hash of block contents plus a hash of calling blocks plus a hash of referrers, etc (this function can be recursively applied, essentially expanding the 'neighborhood' of blocks affecting the signature at each iteration). The program analyzer may also use the block name as provided by debug information as a function. Another signature may include a 'decorated' name of a function, which may include information regarding its inputs and outputs. Similarly, the decorated name could be augmented with the name of the source code file in which the function originates. For example, a sequence of name based signatures may be: first, just the function name, second, function name plus its input/output parameters (I/O), third, function name plus its I/O parameters plus source file from whence it originated.

Lists 350A and 350B (FIG. 4A) comprise indeterminate results as to uniqueness because the function used to generate the signature was not specific enough to resolve a different signature for all the code blocks. Potentially, any of the block numbers in list 350A or 350B could ultimately be stored in the first or second unique list if a different function is used to generate signatures for those block numbers. Additionally, the list analyzer 370 may remove 382P and 392P the blocks from the block graph so that they are not reprocessed thereby conserving clock cycles. As shown in FIG. 4B, block numbers 326A and 324B and 326B would be stored in the first map, while block numbers 320A, 321A, 320B, and 321B are stored in the second map.

FIG. 5 shows the refinement process, wherein the signature generator selects a second function from its repository 335. Largely, the process flow in FIG. 5 parallels the process flow from FIG. 3A except a different function from the repository 335 is being selected. Also, in this particular example, signature 336C is missing, because the list analyzer removed block number 326 since there was no equivalent block in the second program. This means that code or data which originally composed block number 326 no longer exists in the second program, and tests which invoked block 326 in the first program may not be reliable in relation to the second program.

Figure 6:
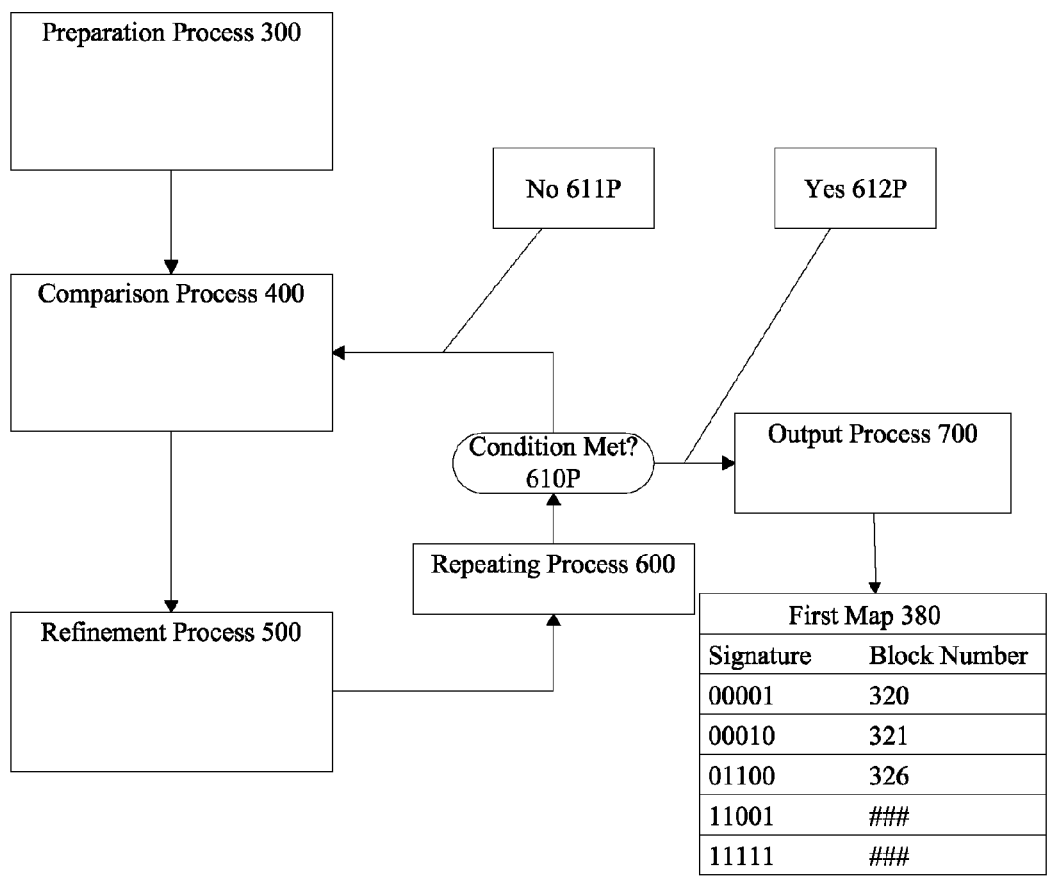
FIG. 6 shows an illustrative configuration of a process flow.

FIG. 6 shows a block diagram illustrating the preparation process 300, the comparison process 400, the refinement process 500, and the repeating process 600, inter alia. The condition met decision 610P (which is a test performed by the repeating process 600) determines whether the comparison and refinement processes should be repeated. There are numerous conditions the repeating process may be configured to use. For example, the repeating process may be configured to cause processes 400 and 500 to repeat 10 times or until a certain time elapses. In other configurations, the repeating process 600 may be configured to repeat processes 400 and 500 while the comparison process generates block numbers in the repeated lists 350A and 350B. In such a configuration, the repeating process is configured to cause the comparison process and refinement process to repeat until no duplicate signatures are generated ("keep cranking up the refinement until distinct signatures are generated.") However, the tightness of the comparison process may also be increased to create differences where there was once equality. In another configuration, the repeating process can determine whether there has been a change in the block numbers stored in the repeated lists 350A and 350B after an $N^{th}$ and $N^{th+1}$ execution. If there is a change, the repeating process may be configured to direct the comparison and refinement processes to repeat, else it may be configured to direct the output process to output the first or second map. In another configuration, the repeating process may be configured to direct the output process to output the first or second map after three repetitions of the comparison and refinement process wherein there has been no change in the first or second map—or the percent change of the first or second map is below a preset threshold.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit) Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A non-transitory computer readable storage media comprising instructions for a program analyzer stored therein, which when executed by one or more processors, cause the one or more processors to perform operations, the program analyzer configured to compare a first program and a second program; each program comprising a plurality of blocks; each block comprising a block identifier and a semantic meaning; the operations comprising:
    a preparation process comprising:
        generating a first block graph of the first program;
        applying, with a signature generator, a function to blocks from the first block graph to generate first signatures;
        storing the first signatures from the first block graph in a first list;
        generating a second block graph of the second program;
        applying, with the signature generator, the function to the blocks from the second block graph to generate second signatures; and
        storing the second signatures from the second block graph in a second list;
    a comparison process comprising:
        identifying signatures that appear only once in the first list;
        identifying signatures that appear only once in the second list;
        determining block numbers associated with the identified signatures that appear either in the first list or the second list, but not in both lists; and
        generating a first map to comprise the block numbers associated with the identified signatures that appear in both the first list and the second list;
    a refinement process comprising:
        selecting a second function for use by the signature generator; and
        generating new signatures for the blocks from the first and second block graphs using the second function, wherein fewer duplicate signatures are generated;

a repetition process comprising repeating the comparison process and refinement process until a condition is met; and an output process comprising outputting the first map comprising a correlation between block numbers in the first program and block numbers in the second program, wherein the first map represents blocks that are likely to have matching semantic meanings in the first and second programs.

2. The non-transitory computer readable storage media of claim 1, wherein the comparison process further comprises removing the blocks from the first and second block graphs that appear exactly once in either the first list or the second list.

3. The non-transitory computer readable storage media of claim 1, wherein the comparison process further comprises removing the blocks from the first and second block graphs that appear in the first list and the second list.

4. The non-transitory computer readable storage media of claim 1, wherein the second function is a more detailed function requiring the signature generator to process more features of the block.

5. The non-transitory computer readable storage media of claim 1, wherein a block is a code block or data block.

6. The non-transitory computer readable storage media of claim 1, wherein the signature generator is configured to create a same signature for two blocks comprising same data or code, and a different signature for two blocks comprising different data or code.

7. The non-transitory computer readable storage media of claim 1, wherein the function the signature generator uses in the preparation process takes fewer clock cycles for the process to execute than the function used in the refinement process.

8. The non-transitory computer readable storage media of claim 1, wherein the signature generator comprises a function repository comprising functions of increasing complexity and specificity.

9. The non-transitory computer readable storage media of claim 8, wherein the signature generator comprises at least three functions and all blocks comprise contents;

wherein a first function is configured to generate a signature based on contents of a current block;

wherein a second function is configured to generate a signature based on the contents of the current block, plus contents of other blocks which refer to the current block; and wherein a third function is configured to generate a signature based on the contents of the current block, plus the contents of other blocks which refer to the current block, plus contents of other blocks the current block refers to.

10. The non-transitory computer readable storage media of claim 1, wherein the repetition process is configured to repeat the preparation, comparison, and refinement processes, n number of times, wherein n is an integer greater than zero.

11. The non-transitory computer readable storage media of claim 1, wherein the repetition process is configured to repeat until the block numbers in the first map remain the same after one execution of the refinement process.

12. The non-transitory computer readable storage media of claim 1, wherein the repetition process is configured to repeat until the block numbers in the first map remain the same after two executions of the refinement process.

13. The non-transitory computer readable storage media of claim 1, wherein the comparison process further comprises updating a second map with block numbers associated with the identified signatures that appear exactly once in only one of the first list and the second list.

14. The non-transitory computer readable storage media of claim 13, wherein the second map comprises: a list of block numbers in the first program which do not exist in the second program and a list of block numbers in the second program which do not exist in the first program; wherein the second map represents blocks that were changed between the first and second programs.

15. A non-transitory computer readable storage media comprising instructions for a program analyzer stored therein, which when executed by one or more processors, cause the one or more processors to perform operations, the program analyzer configured to compare a first program and a second program; each program comprising a plurality of blocks; each block containing a block identifier; the operations comprising:

a preparation process comprising:
  generating a first block graph of the first program;
  applying, with a signature generator, a function to blocks from the first block graph to generate first signatures;
  storing the first signatures from the first block graph in a first list;
  generating a second block graph of the second program;
  applying, with the signature generator, the function to blocks from the second block graph to generate the second signatures; and
  storing the second signatures from the second block graph in a second list;

a comparison process comprising:
  identifying signatures that appear only once in the first list;
  identifying signatures that appear only once in the second list;
  determining block numbers associated with the identified signatures that appear either in the first or second list, but not in both lists; and
  storing block numbers associated with the identified signatures that appear exactly once in only one of the first list and the second list in a first map;
  storing block numbers associated with the identified signatures that appear in both the first list and the second list in a second map;

a refinement process comprising:
  selecting a second function for use by the signature generator; and
  generating new signatures for the blocks from the first and second block graphs using the second function, wherein fewer duplicate signatures are generated;

a repetition process comprising repeating the comparison process and refinement process until a condition is met; and an output process comprising outputting the first map, second map, or both.

16. The non-transitory computer readable storage media of claim 15, wherein the comparison process further comprises:
  removing the blocks from the first and second block graphs that appear exactly once in only one of either the first list or the second list; and
  removing the blocks from the first and second block graphs that appear in both the first list and the second list.

17. The non-transitory computer readable storage media of claim 15, wherein the function the signature generator uses in the preparation process takes fewer clock cycles for the process to execute than the function used in the refinement process.

18. The non-transitory computer readable storage media of claim 15, wherein the signature generator comprises a function repository comprising functions of increasing complexity and specificity.

19. The non-transitory computer readable storage media of claim 15, wherein the signature generator comprises at least three functions and all blocks comprise contents;
  wherein a first function is configured generate a signature based on contents of a current block;
  wherein a second function is configured to generate a signature based on the contents of the current block, plus contents of other blocks which refer to the current block; and
  wherein a third function is configured to generate a signature based on the contents of the current block, plus the contents of other blocks which refer to the current block, plus contents of other blocks which the current block refers to.

20. The non-transitory computer readable storage media of claim 15, wherein the repetition process is configured to repeat until the block numbers in the first map remain the same after one execution of the refinement process.

21. The non-transitory computer readable storage media of claim 15, wherein the repetition process is configured to repeat until the block numbers in the first map remain the same after two executions of the refinement process.

22. The non-transitory computer readable storage media of claim 15, wherein the first map comprises a list of block numbers in the first program which do not exist in the second program and a list of block numbers in the second program which do not exist in the first program, wherein the first map represents blocks that were changed between the first and second programs.

23. A process for determining similarities or differences between a first program and a second program; each program comprising a plurality of blocks; each block containing a block identifier; the process comprising a preparation process, comparison process, refinement process, repetition process, and output process:
  the preparation process comprising:
    generating a first block graph of the first program;
    applying, with a signature generator, a function to blocks from the first block graph to generate first signatures;
    storing the first signatures from the first block graph in a first list;
    generating a second block graph of the second program;
    applying, with the signature generator, the function to the blocks from the second block graph to generate the second signature; and
    storing the second signatures from the second block graph in a second list;
  the comparison process comprising:
    identifying signatures that appear only once in the first list;
    identifying signatures that appear only once in the second list;
    determining block numbers associated with the identified signatures that appear either in the first list or the second list, but not in both lists;
    generating a first map to comprise the block numbers associated with the identified signatures that appear in both of the first list and the second list;
  the refinement process comprising:
    selecting a second function for use by the signature generator; and
    generating new signatures for the blocks from the first and second block graphs using the second function, wherein fewer duplicate signatures are generated;
  the repetition process comprising repeating the comparison process and refinement process until a condition is met; and
  the output process comprising outputting the first map comprising a correlation between block numbers in the first program and block numbers in the second program, wherein the first map represents block pairs in the first and second programs that share a similar semantic meaning.

24. A process for comparing a first program and second program; each program comprising a plurality of blocks; each block comprising a block identifier; the process comprising a preparation process, comparison process, refinement process, repetition process, and output process:
  the preparation process comprising:
    generating a first block graph of the first program;
    applying, with a signature generator, a function to blocks from the first block graph to generate first signatures;
    storing the signatures from the first block graph in a first list;
    generating a second block graph of the second program;
    applying, with the signature generator, the function to blocks from the second block graph to generate second signatures;
    storing the second signatures from the second block graph in a second list;
  the comparison process comprising:
    identifying signatures that appear only once in the first list;
    identifying signatures that appear only once in the second list;
    determining block numbers associated with the identified signatures that appear either in the first or second list, but not in both lists;
    storing block numbers associated with the identified signatures that appear exactly once in only one of the first list and the second list in a first map;
    storing block numbers associated with the identified signatures that appear in both the first list and the second list in a second map;
  the refinement process comprising:
    selecting a second function for use by the signature generator; and
    generating new signatures for the blocks from the first and second block graphs using the second function, wherein fewer duplicate signatures are generated as compared to the first function;
  the repetition process comprising repeating the comparison process and refinement process until a condition is met; and
  the output process comprising outputting the first map, second map, or both.

* * * * *